Patented Sept. 8, 1942

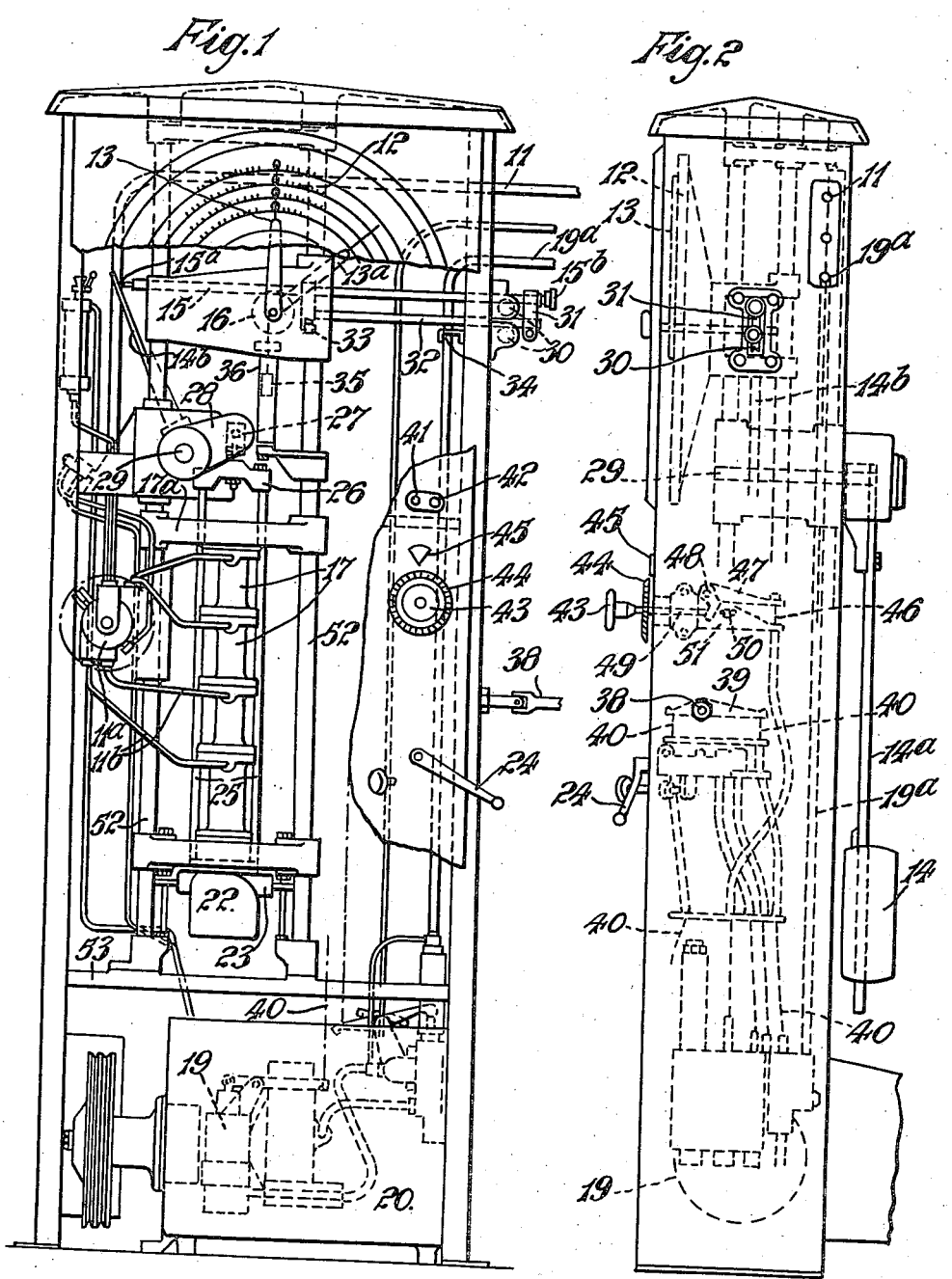

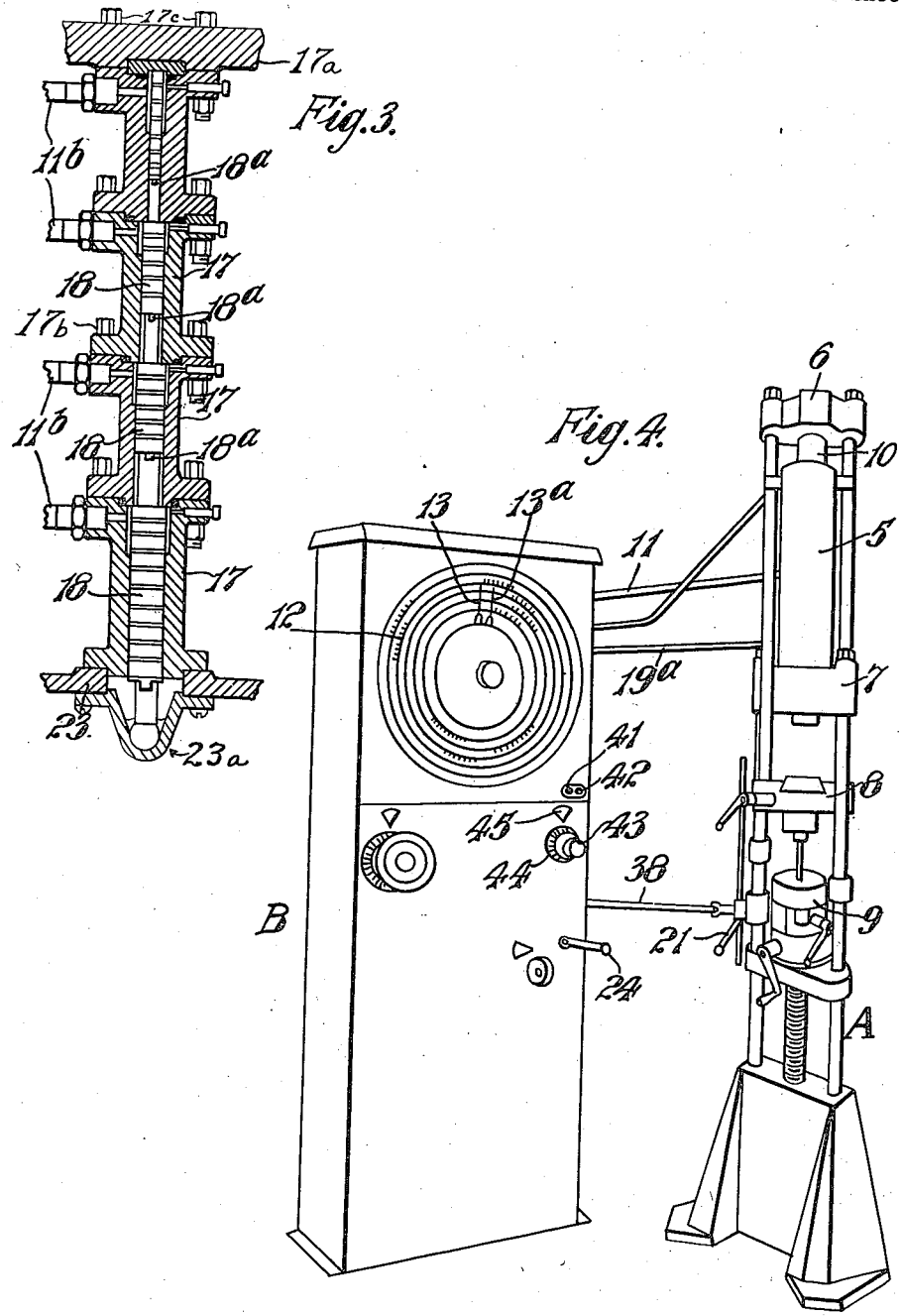

2,295,249

UNITED STATES PATENT OFFICE 2,295,249

HYDRAULIC TESTING MACHINE

Harry Yates, Birmingham, England, assignor to W. & T. Avery Limited, Birmingham, England Application May 1, 1941, Serial No. 391,315
In Great Britain March 1, 1940

6 Claims. (Cl. 265—14)

This invention has reference to improvements in hydraulic testing machines, and is more particularly concerned with machines which embody a hydraulic straining gear for effecting the various tests on the specimen, said gear preferably being associated with an automatic indicating resistant mechanism of the kind embodying a plurality of stages of indication of different capacity values or ranges, whereby the one straining gear may be associated according to the particular test concerned with the preselected section or range of capacity indication which is the most appropriate to that test.

One object of the invention is to provide means associated with the hydraulic straining cylinder or gear whereby the aforesaid different straining capacity or range can be connected to the automatic indicating resistant mechanism without involving variation of the said resistant, the connection also avoiding the use or employment of an interposed lever system according to known and established practice. A further object of the present invention is to provide means for effecting a quick initial or setting motion of the straining gear which is associated with the means for the carrying out of the actual test upon the specimen, the control of the said setting motion or motions being effected by the operator through the intermediary of a control lever remote from the source of hydraulic power and incorporating means for automatically cutting-out the setting and the straining operation at the requisite position or moment. The invention has as a yet further subordinate objective means for automatically putting the machine out of operation upon the completion of any given test so that no damage can result from a continued operation of the mechanism.

The invention consists of a hydraulic testing machine wherein a plurality of differential ram cylinders are interposed between the hydraulic straining unit and the indicating mechanism, said mechanism incorporating an indicating range in proportion to each differential ram cylinder capacity, the rams of the said cylinders having means which admit of the interconnection of the rams one to another, and means for effecting a rotation of the rams within the cylinders; the proportional pressure applied through the said cylinders being communicated to an automatic load resistant which in turn is connected to the traversable index of the indicating mechanism, means being provided for adjusting the setting of the automatic resistant according to the desired load range or capacity, and for effecting a control of the pump unit for the setting and straining motions of the testing unit, means being incorporated for effecting an automatic cessation of the straining operation upon the completion of any given test.

The invention will now be described with particular reference to the accompanying drawings, which illustrate as much of the mechanism and details of the testing machine as are necessary to an understanding of the features embodied in the present invention.

In the drawings similar reference numerals indicate similar parts in the several views.

Fig. 1 is a front elevation illustrating as much of the load transmission and resistant and indicator mechanism as is necessary to an appreciation of the essential features of this invention.

Fig. 2 is a side elevation of Fig. 1.

Fig. 3 is a front sectional elevation to an enlarged scale of the interconnected differential rams and cylinders seen in Fig. 1.

Fig. 4 is a perspective view illustrating the general lay-out and arrangement of the complete apparatus showing the testing or straining unit coupled to the load resistant and indicator unit.

According to the illustrated embodiment of this invention as applied to a hydraulic testing machine adapted for effecting tensile, compression, and bending tests, the straining unit generally designated A (Fig. 4) is of a known kind incorporating a main hydraulic cylinder 5 arranged between two crossheads 6 and 7, the crosshead 6 being connected to the upper grip holder 8 and the lower crosshead 7 being connected to the lower grip holder 9 adjustably mounted on the base of the straining unit in accordance with known practice, the specimen being interposed between the grip holders 8 and 9 or between the crosshead 7 and the holder 8 according to the test which is to be applied thereto. The piston 10 which is reciprocable within the cylinder 5 is connected to the upper crosshead 6 while the cylinder structure itself is connected to the lower crosshead 7.

The testing or straining unit A is coupled through a series of pipes and link rod connections to the load transmission and resistant mechanism and to the indicator mechanism all of which mechanism is disposed within a housing which also contains the motor-driven pump unit; this part of the apparatus is generally designated B.

The cylinder 5 is connected through a pipe-line 11 to an automatic load indicating mechanism generally designated 12 which is in the form of a dial having a plurality of (say four) concentric charts thereon covering four different load capacities or ranges, the load applied being indicated on the dial or charts by means of a rotatable pointer or index 13, the resistant being in the form of a pendulum 14 which is associated with the pointer or index 13 through the arm 14b, the rack 15 and the pinion 16 on the spindle of which the pointer 13 is mounted.

Interposed between the main hydraulic cylinder 5 of the testing unit A and the said load resistant mechanism is a plurality of (say four) hydraulic cylinders 17, each of which is provided with a piston or ram 18, the said cylinders and the pistons or rams each having a different capacity as will be appreciated by particular reference to Fig. 3 of the drawings, each cylinder having a determined proportional ratio to that of the main straining cylinder 5. These ram cylinders 17 are connected to the load resistant of the automatic indicating mechanism so that the power factor of the load resistant remains the same for all the capacities or ranges irrespective of the load applied to the straining unit. The concentric rings or charts constituting part of the dial indicating mechanism 12 are also co-related to the area or capacity of the differential ram cylinders 17 in such a way that one of the said ring charts is the indicia from which an observation can be made of the load applied to the specimen according to the particular differential ram cylinder or cylinders through which a predetermined proportion of this load passes as will be hereinafter described.

Hydraulic pressure is applied simultaneously to the main straining cylinder 5 and to the preselected proportional ram cylinder or cylinders 17 by means of a motor-driven duplex oil pump generally designated 19 through valve-controlled pipe lines, the pump being of the type incorporating both a comparatively high volume at low pressures and a comparatively low volume at high pressures which admit of a quick initial setting of the motion of the straining ram and also of the requisite speed of motion for the actual straining or test, whereby adaptability and economy of time are provided, the pump being immersed in an oil reservoir 20.

The low pressure side of the pump 19 is used for quick setting prior to testing, and the high pressure side is used for straining purposes only.

The control of the low pressure pump is effected by means of a lever 21 mounted on the framework of the straining unit which lever constitutes a remote control whereby the operator can connect the pump to the main hydraulic cylinder 5 to effect the requisite setting operation.

The differential proportional ram cylinders 17 are arranged co-axially one above another in such a manner that the ram or piston 18 of one cylinder is brought into contact with the ram or piston immediately adjoining same, the coupling being in the form of what may be termed a dog-clutch 18a between adjacent or abutting faces of the rams or pistons 18, a key on the one face of a ram or piston being adapted to engage with a keyway or slot on the adjacent face of the abutting ram or piston immediately above or below the same as the case may be. This feature is clearly illustrated in Fig. 3 of the drawings.

Provision is desirably made for effecting a relatively slow rotation of the rams or pistons within their cylinders, say by means of a small electric motor 22, which comprises a self-contained motor, the rotatable driving unit whereof is connected to the lowest ram or piston 18 through gearing so as to prevent cohesive friction obtaining between the peripheries of the rams or pistons and the walls of the cylinders, and thereby enhance the accuracy of the test, the said motor transmission unit 22 being mounted on a yoke 23 disposed below the lowest of the said differential cylinders 17 to which yoke the hydraulic straining force applied through the said pistons is communicated by means of a ball-thrust connection 23a from the lowest piston to the yoke 23.

The yoke 23 is suspended by means of a pair of vertical rods 25 located on either side of the said differential cylinders and is connected to an overhead yoke 26. These yokes together with the said connecting rods constitute a framework surrounding the co-axial cylinders 17, the uppermost yoke 26 being connected through linkage 27 to a crank 28 which is mounted on a spindle 29 on which is also mounted the arm 14a carrying the pendulous resistant weight 14. The differential cylinder assembly, held together, for example, by bolts 17b, is supported as by bolts 17c at the upper end from a crosshead 17a mounted on a pair of pillars 52 supported on the cross member 53 which forms part of the framework of the housing for this part of the mechanism. For the sake of clarity, the method of supporting the upper end of the differential cylinder assembly is not shown in Fig. 1, but is illustrated in Fig. 3, which is on a larger scale.

It will be appreciated that it is necessary in a multi-capacity machine of this type where it is desired to maintain the pendulous weight as a constant that a variable angular motion is permitted to the pendulum according to the different testing capacities or ranges, hence the necessity for effecting an initial setting of the indicator 13 at the zero graduation prior to the commencement of any given test. This initial setting is effected by means of an arm 14b radially extending from the spindle 29. This extending arm 14b is provided with a machined face which is adapted to be maintained in contact with a hardened cone point 15a formed at one end of the continuous worm-screw rack 15 which is adapted to be longitudinally displaced relative to the bearing guide rollers 30 according to the motion of the said extending arm 14b associated with the pendulum 14, the said rack 15 meshing with and rotating the pinion 16 on the spindle on which the load indicator or index 13 is mounted, said load indicator being indicatively common to all the different ranges or capacities of the testing machine.

The end of the worm-screw rack 15 remote from that associated with the extending arm is screw-threaded and passes through a tapped bush 31 which bush also constitutes a means of connection to a supplementary rod 32 disposed in parallel relationship to the rack 15, this rod 32 being adapted for longitudinal sliding motion between the guide rollers 30 with and in relation to the rack 15. At one end this rod is provided with an adjustable contact stop 33, while the other end may be provided with a recording stylus (not shown) when the mechanism is associated with an autographic stress strain recorder. The setting of the rack 15 is facilitated by means of a knurled head 15b thereon. Mounted on the frame of the machine in the path of the adjustable contact stop 33 is a switch mechanism 34 which is in the circuit of the motor operating the pump 19 so that when the stop 33 makes contact with the switch 34 which obtains at maximum load, then the circuit through the motor is broken and no further load is applied to the specimen.

It will be appreciated that when the rack 15 is set in relation to the zero position of the pendulous arm 14a prior to the commencement of any given range or capacity of test by means of the knurled knob 15b, that the setting of the rack 15 also serves to effect a setting of the supplementary associated rod 32 carrying the adjustable contact stop 33, and that a correct zero setting of the indicator 13 can thus be readily made corresponding to any different range or capacity of test.

A dependent weight 35 is employed to urge the pinion 16 to maintain the cone point 15a on the one end of the rack 15 in contact with the arm 14b at the variable setting which obtains in accordance with different testing ranges or capacities, this dependent weight being preferably located within and forming part of a dashpot 36 which serves to steady the motion of this part of the mechanism.

The setting of the starting lever 21 which connects the low pressure pump 19 to the main hydraulic cylinder 5 when moved to the starting position through the rod 38 effects a rocking of the lever 39 which through flexible connections 40 starts the operation of the low pressure pump circuit until the crosshead 8 is disposed in a convenient position for the insertion of the specimen, or the commencement of the test.

The straining lever 24 is now operated and through linkage opens the high pressure pump circuit to the main cylinder 5 thereby effecting a straining operation on the specimen, the rate of straining being determined by the setting of the knob 43 through a mechanism hereinafter described. Upon the completion of a test and to bring the straining crosshead 8 in a convenient position either for the removal of the fractured specimen or to reset the apparatus for a subsequent test, the lever 21 is reversed and through the rod 38, lever 39 and flexible connections 40 releases the hydraulic pressure in the main cylinder 5 to atmosphere.

It will be appreciated that the necessary controls are provided on the frame of the machine, for example "start" and "stop" press buttons 41 and 42 (see Fig. 4) are provided which control the switch mechanism in the circuit of the electric motor which is employed for driving the pump 19, and knobs or levers are provided extending from the frame of the machine for opening and closing or setting the various controls or valves between the pump 19 and the main straining cylinder 5, and between this cylinder 5 and the proportional or differential cylinders 17, which in turn are connected to the automatic load indicating mechanism, and that a by-pass is provided from the outlet of the pump to the reservoir 20 so that when the pump has been put into operation but is not required for effecting the straining motion the liquid can pass into the reservoir and back to the pump.

The pipe-line 11 extends into a four-way valve chamber 11a from which chamber extend branch pipes 11b which in turn have connection with the interior of the cylinders 17 so that a valve-controlled continuous liquid flow obtains between the pump 19, the main straining cylinder 5 and the proportional differential cylinders 17, valve control means being provided with an external setting mechanism arranged on the frame of the machine for determining the pipe-line or liquid flow to be employed in any given test.

The dial indicating mechanism is also provided with a maximum load pointer 13a according to recognised practice which will be carried around the dial through its contact with the index pointer 13 and will remain at the maximum load position until re-set after the completion of a given test in accordance with well recognised testing machine practice.

The knob 43 rotatably mounted on the frame of the straining unit is provided with a graduated index disc 44 which registers against the fixed pointer 45 to afford an indication of the rate of straining which is permitted and controlled by the valve setting in the outlet pipeline 19a from the pump 19 to the main cylinder 5. This valve control is effected through the control wire 46 which is harnessed to the end of the bellcrank lever 47 pivoted on the pin 48, the short arm of this lever maintaining contact with the outer end of a spindle 49 which is moved backwards and forwards by the rotation and setting of the knob 43, this longitudinal motion of the spindle 49 being effected in any convenient manner by the rotation of the knob 43. An adjustable limit stop 50 is provided on the bracket 51 which forms the mounting for the pin 48 of the bellcrank lever 47 and for the longitudinal reciprocal spindle 49 and the parts connected thereto.

I claim:

1. A hydraulic testing machine comprising, in combination, a hydraulic straining unit, a plurality of ram cylinders hermetically separated from one another, each having a ram of different projected area, and each being connected to a separate passage for hydraulic fluid, means for diverting hydraulic pressure from said hydraulic straining unit selectively to the passages leading to the various ram cylinders to provide different measuring capacities, a load resistant operatively connected to said ram cylinders for measuring the hydraulic pressure so applied, and indicating mechanism, comprising a traversable indicator connected to said load resistant, having an indicating range of different capacity for each of said ram cylinders.

2. A hydraulic testing machine according to claim 1, comprising means for rotating with respect to one another the ram and cylinder of each of said ram cylinders to obviate cohesive friction between the periphery of the ram and the wall of the cylinder.

3. A hydraulic testing machine according to claim 1, comprising means for adjusting the setting of said indicating mechanism.

4. A hydraulic testing machine according to claim 1, comprising a pump unit for supplying fluid under pressure to said hydraulic straining unit, means for selectively controlling said pump unit to effect setting motion and straining motion of said hydraulic straining unit, and means actuated by said indicating mechanism at the limit of its normal movement for rendering said pump inoperative to effect further straining motion of said hydraulic straining unit.

5. A hydraulic testing machine according to claim 1, comprising an adjustable rack and pinion connection between said load resistant and said traversable indicator to provide for initial zero setting of the indicator prior to the commencement of a test.

6. A hydraulic testing machine according to claim 1, wherein said load resistant comprises a pendulum, and the ram cylinders are aligned and their rams are connected end to end.

HARRY YATES.